Nov. 22, 1966     C. E. TACK     3,286,658
SIX-WHEEL TRUCK BOLSTER
Original Filed Feb. 14, 1962     2 Sheets-Sheet 1
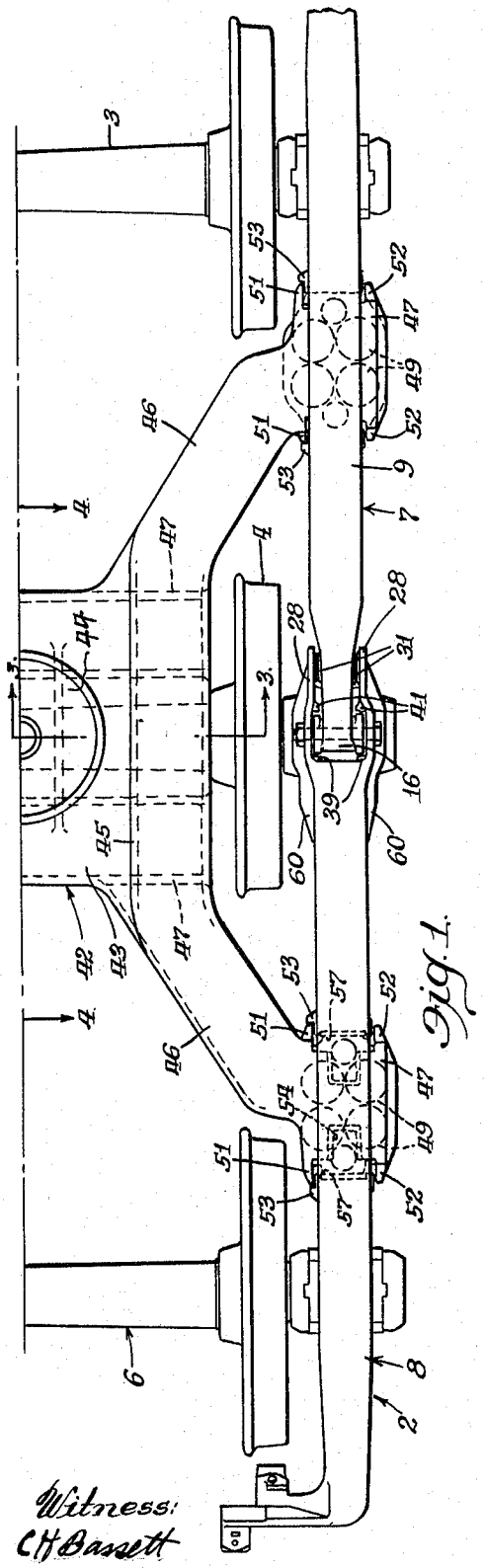
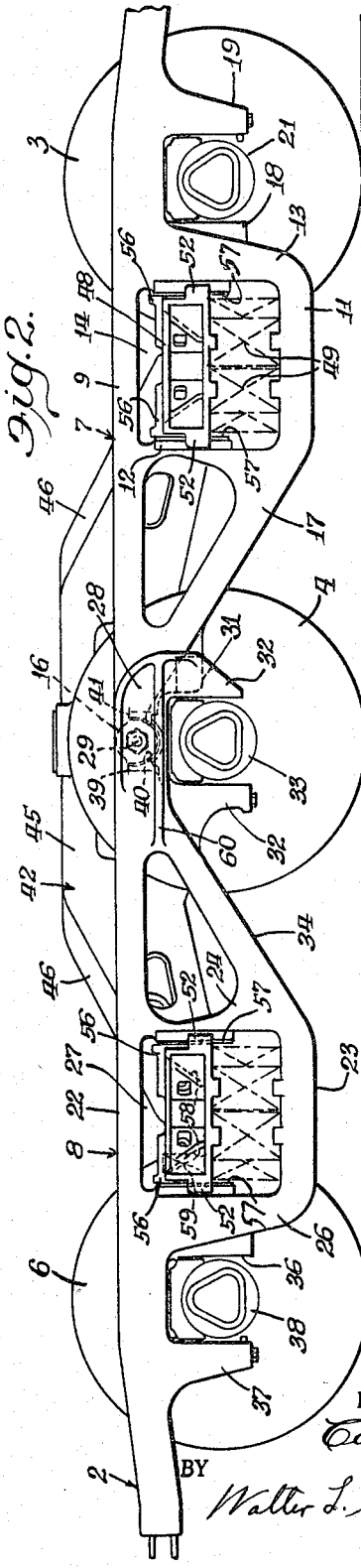
INVENTOR.
Carl E. Tack
BY Walter L. Schlegel, Jr.
Atty.
Witness:
C. H. Bassett Nov. 22, 1966   C. E. TACK   3,286,658
SIX-WHEEL TRUCK BOLSTER Original Filed Feb. 14, 1962   2 Sheets-Sheet 2

United States Patent Office 3,286,658
Patented Nov. 22, 1966

3,286,658
SIX-WHEEL TRUCK BOLSTER
Carl E. Tack, Elmhurst, Ill., assignor to Amsted Industries Incorporated, Chicago, Ill., a corporation of New Jersey
Original application Feb. 14, 1962, Ser. No. 173,232, now Patent No. 3,220,357, dated Nov. 30, 1965. Divided and this application Apr. 8, 1965, Ser. No. 446,547
1 Claim. (Cl. 105—227)

This is a division of application Serial No. 173,232, filed February 14, 1962.

This invention relates to railway car trucks and, more particularly, to a bolster for a six-wheel freight car truck.

The bolster of the present invention is especially useful with the six-wheel, self-aligning, spring plankless railway freight car truck of application Serial No. 173,232, wherein the side frames are free within controlled limits to adjust themselves to track conditions. On entering curved track sections, the truck is adapted to yield slightly to external forces tending to pull it out of square against the resistance of the bolster springs to angular distortion. On re-entering straight track, the resistance of the bolster springs to temporary distortion restores the truck to its normally square condition.

An object of the invention resides in the provision of a bolster of reinforced construction.

Another object of the invention resides in the provision of a bolster which is constructed with elements of box section.

A further object of the invention resides in the provision of a bolster for a self-aligning freight car truck embodying side frames supported upon three wheel and axle assemblies.

Another object of the invention resides in the provision of a bolster having four legs diverging outboardly from a central body portion toward and into their respective side frame windows, the outer end of each leg being resiliently supported upon a spring group seated on a side frame section tension member, and each leg being provided with two pockets to receive shoes biased into frictional engagement against their respective columns by compression springs.

Another object of the invention resides in the provision of improvements in a one-piece bolster structure for a six-wheel railway car truck, wherein longitudinal legs of box section are arranged upon the ends of spaced transverse reinforcing members of box section provided under the body portion of the bolster.

The invention embodies other novel features, details of construction and arrangement of parts which are hereinafter set forth in the specification and claim and illustrated in the accompanying drawings, forming part thereof, wherein:

FIGURE 1 is a top plan view illustrating a six wheel railway car truck embodying features of the invention, only one-half of the truck being shown as opposite sides of the truck are similar in construction;

FIGURE 2 is a side elevation showing the truck structure illustrated in FIGURE 1;

Figure 4:
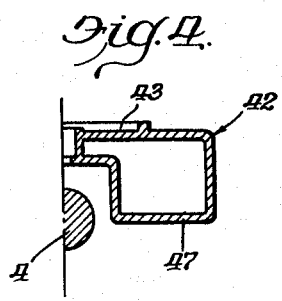
FIGURE 4 is a section taken along the line 4—4 of FIGURE 1.

Referring to FIGURES 1 and 2 for a better understanding of the truck including the bolster of this invention, the six wheel spring plankless railway car truck is shown as comprising spaced side frames 2 supported upon three wheel and axle assemblies 3, 4 and 6, each side frame embodying two pivotally connected sections 7 and 8.

The side frame section 7 is preferably in the form of a one-piece metal casting comprising a beam member 9 and spring seat member 11 interconnected by spaced columns 12 and 13 to define a window 14. A pivot head 16 is provided on the inner end of the beam member 9, and a tension member 17 extends upwardly from the spring seat member 11 to merge with the beam member adjacent the pivot head. The outer side of the column 13 is formed to provide an inner pedestal jaw 18 which coacts with an outer pedestal jaw 19 depending from the beam member 9 to engage a journal box 21 containing anti-friction roller bearings of any conventional type to receive a journal portion on the wheel and axle assembly 3.

The side frame section 8 is also preferably in the form of a one-piece metal casting comprising a beam member 22 and a spring seat member 23 interconnected by spaced columns 24 and 26 to define a window 27. Spaced vertical walls 28 are provided on the inner end of the beam member 22 to receive the pivot head 16 therebetween, the head being pivotally connected to the walls by means of a bolt 29 extending therethrough. As illustrated in FIGURE 1, the walls 28 extend from the head 16 along opposite sides of the beam member 9 to engage pads 31 thereon to limit lateral and angular deflection of the section 7 relative to the section 8.

Spaced pedestal jaws 32 extend downwardly from the inner end of the beam member 22 to receive a journal box 33 therebetween, said box containing conventional roller bearings to engage a journal portion of the wheel and axle assembly 4. A tension member 34 extends upwardly from the inner column 24 to merge with the inner end of the beam member 22 adjacent the pedestal jaws 32. A pedestal jaw 36 formed on the outer side of the column 26 coacts with a pedestal jaw 37 depending from the beam member 22 to engage a journal box 38 provided with roller bearings to receive a journal portion of the wheel and axle assembly 6.

The head 16 is supported for rocking movement upon an arcuate bearing 40 provided on the inner end of the side frame section 8 between the vertical walls 28, and stop lugs 39 and 41 are formed on each wall 28 to engage opposite sides of the head 16. The inner end of the side frame section 8 is reinforced by means of ribs 60 extending longitudinally along the outer sides of the walls 28.

Figure 3:
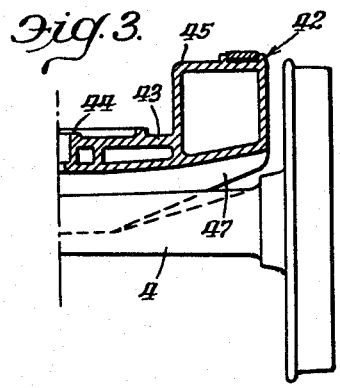
FIGURE 3 is a transverse section taken along the line 3—3 of FIGURE 1.

A bolster 42 interconnects and is resiliently supported upon the four side frame sections 7 and 8. Referring now to FIGURES 3 and 4, bolster 42 is shown as comprising a one-piece metal casting having a body portion 43 formed with a central pivot pin bearing surface 44. Beams 45 of box section extend longitudinally along opposite sides of the body portion 43 and merge with outboardly diverging legs 46. To reinforce the bolster structure, spaced beams 47 of box section extend transversely under the body portion 43 and under the longitudinal beams 45 adjacent the inboard ends of the legs 46.

As illustrated in FIGURE 1, the bolster 42 is symmetrical about its longitudinal and transverse center lines, and said transverse center line is in a common vertical plane with the axis of rotation of the wheel and axle assembly 4.

The outboard end of each leg 46 merges with a foot portion 48 of box section disposed within a window of its respective side frame section and resiliently supported upon a spring group 49 seated on a spring seat member. Each foot portion 48 is provided with inboard and outboard lugs 51 and 52 straddling their respective side frame columns, the inboard lugs 51 also being engageable against stop lugs 53 provided on each side frame section.

Pockets 54 are provided on the sides of each bolster foot portion 48 to receive friction shoes 56 for engagement against wear plates 57 provided on the columns, said pockets being formed with wedge surfaces 58 inclined upwardly toward their respective wear plates. The friction shoes are urged upwardly against and along said wedge surfaces 58 by means of compression springs 59. The pockets 54 and friction shoes 56 may be formed and arranged as disclosed in United States Patent No. 2,953,995 granted September 27, 1960 to A. F. Baker, which patent is incorporated herein by reference.

I claim:

A bolster for a railway car truck comprising an integral casting including a body portion of relatively shallow depth and short transverse extent, the body portion including vertically spaced elements, the bolster including longitudinal beams of box section at the sides and above the body portion, legs of box section forming continuations of and extending from the longitudinal ends of the beams in directions longitudinally and laterally from the body portion, the legs at their juncture with the body portion extending vertically from the bottom surface of the body portion above the top surface thereof, the legs tapering vertically from their juncture with the body portion to their extended ends and having foot portions of box section at their extended ends, said foot portions having friction shoe pockets in their longitudinally fore and aft sides, and longitudinally extending transversely spaced lugs on opposite sides of the pockets, and transverse beams of box section under the body portion and extending the full width of the body portion and to the lateral limits of the longitudinal beams, the top and bottom elements of the box section transverse beams forming continuations of said spaced elements of the body portion, the transverse beams tapering at their outer ends to reduced depth at the laterally outer limits of the longitudinal beams.

References Cited by the Examiner

UNITED STATES PATENTS

| | | | |
|---|---|---|---|
| 1,054,697 | 3/1913 | Lewis et al. | 105—196 |
| 1,102,620 | 7/1914 | Westlake | 105—196 |
| 1,196,462 | 8/1916 | Kadel et al. | 105—196 |
| 1,213,252 | 1/1917 | Pilcher | 105—227 |
| 2,040,706 | 5/1936 | Orr | 105—227 |
| 2,557,616 | 6/1951 | Settles et al. | 105—197 |
| 2,575,888 | 11/1951 | Orr | 105—229 |
| 2,748,721 | 6/1956 | Holin | 105—193 |
| 2,843,058 | 7/1958 | Travilla et al. | 105—230 |
| 2,896,550 | 7/1959 | Wulff | 105—207 |

ARTHUR L. LA POINT, *Primary Examiner.*

H. BELTRAN, *Assistant Examiner.*